United States Patent [19]

Lee

[11] 3,724,926

[45] Apr. 3, 1973

[54] OPTICAL PULSE MODULATOR

[75] Inventor: Tien Pei Lee, Middletown, N.J.

[73] Assignee: Bell Telephone Laboratories, Inc., Murray Hill, N.J.

[22] Filed: Aug. 9, 1971

[21] Appl. No.: 140,127

[52] U.S. Cl. ...........350/160 R, 250/199, 317/234 R, 330/4.3, 332/7.51

[51] Int. Cl. ..........................................G02f 1/36

[58] Field of Search .......330/4.3; 250/199; 332/7.51; 331/94.5; 317/235; 313/108 D; 307/312

[56] References Cited

UNITED STATES PATENTS

| | | | |
|---|---|---|---|
| 3,599,019 | 8/1971 | Nannichi et al. | 307/312 |
| 3,427,563 | 2/1969 | Lasher | 331/94.5 |
| 3,484,713 | 12/1969 | Fenner | 331/94.5 |

*Primary Examiner*—Edward S. Bauer
*Attorney*—R. J. Guenther and Arthur J. Torsiglieri

[57] ABSTRACT

A high speed optical modulator, in accordance with the present disclosure, comprises a pair of p-n junction diodes, one of which is an amplifier, and the other of which is a saturable absorber. A constant current initially forward-biases the amplifier to approximately unity gain. A pulse-encoded information signal is superimpressed upon this constant bias such that incident optical pulses are transmitted at unity gain for one binary state of the information signal and at a greater gain for the other binary state. The power ratio of the optical pulses for the two binary states is then increased by the saturable absorber which attenuates the smaller optical signal to a much greater extent than it attenuates the larger signal.

7 Claims, 5 Drawing Figures

INVENTOR
T. P. LEE
BY Sylvan Sherman
ATTORNEY

OPTICAL PULSE MODULATOR

This invention relates to high speed, optical modulators.

BACKGROUND OF THE INVENTION

Pulse code modulated (PCM) communications systems, using light waves as the carrier of information, will require some means of signal processing at the end terminals, and at intermediate repeater locations along the transmission path. To this end, it has been proposed by S. E. Miller ("Integrated Optics: An Introduction," published in the September, 1969 issue of the Bell System Technical Journal) to employ integrated optical circuits to perform the various signal processing functions. Consistent with this approach, the present invention is a high-speed modulator that is particularly adapted to operate in conjunction with solid state, injection lasers, and with integrated circuits of the type described by Miller.

SUMMARY OF THE INVENTION

A high speed, optical PCM modulator, in accordance with the present invention, comprises a pair of p-n junction diodes advantageously provided with anti-reflection coatings to prevent lasing. ONe of the diodes serves as an amplifier. The second diode, which is located immediately adjacent to the first, serves as a saturable absorber.

In operation, optical pulses are coupled to the amplifier diode in synchronism with a binary-encoded information signal. The latter provides biasing pulses which increase the amplifier gain from unity, corresponding to one binary state, (i.e. "0") to a much larger value for the other binary state, (i.e. "1"). The optical pulses are then coupled to the second diode which transmits the amplified pulses with relatively little attenuation, but more highly attenuates the smaller, unamplified pulses, thereby further enhancing the power ratio between optical pulses representing the two binary states.

It is a feature of the invention that it can operate at bit rates of the order of 500 MHz and greater.

These and other objects, features and advantages of the present invention will appear more fully upon consideration of the illustrative embodiments now to be described in detail in connection with the accompanying drawings.

BRIEF DESCRIPTION OF THE DRAWINGS

Referring to the drawings, FIG. 1 shows an optical system including an optical signal source 13, a binary encoder 14, and a modulator 10. The latter, in accordance with the present invention, includes an optical signal amplifier 11 whose gain can be switched back and forth between two values, and an optical signal saturable absorber 12 whose attenuation to optical wave energy is inversely related to the optical power applied thereto. More specifically, the modulator comprises two p-n junction diodes, and means for separately biasing each of the diodes in a manner to be described in greater detail hereinbelow.

Figure 1:
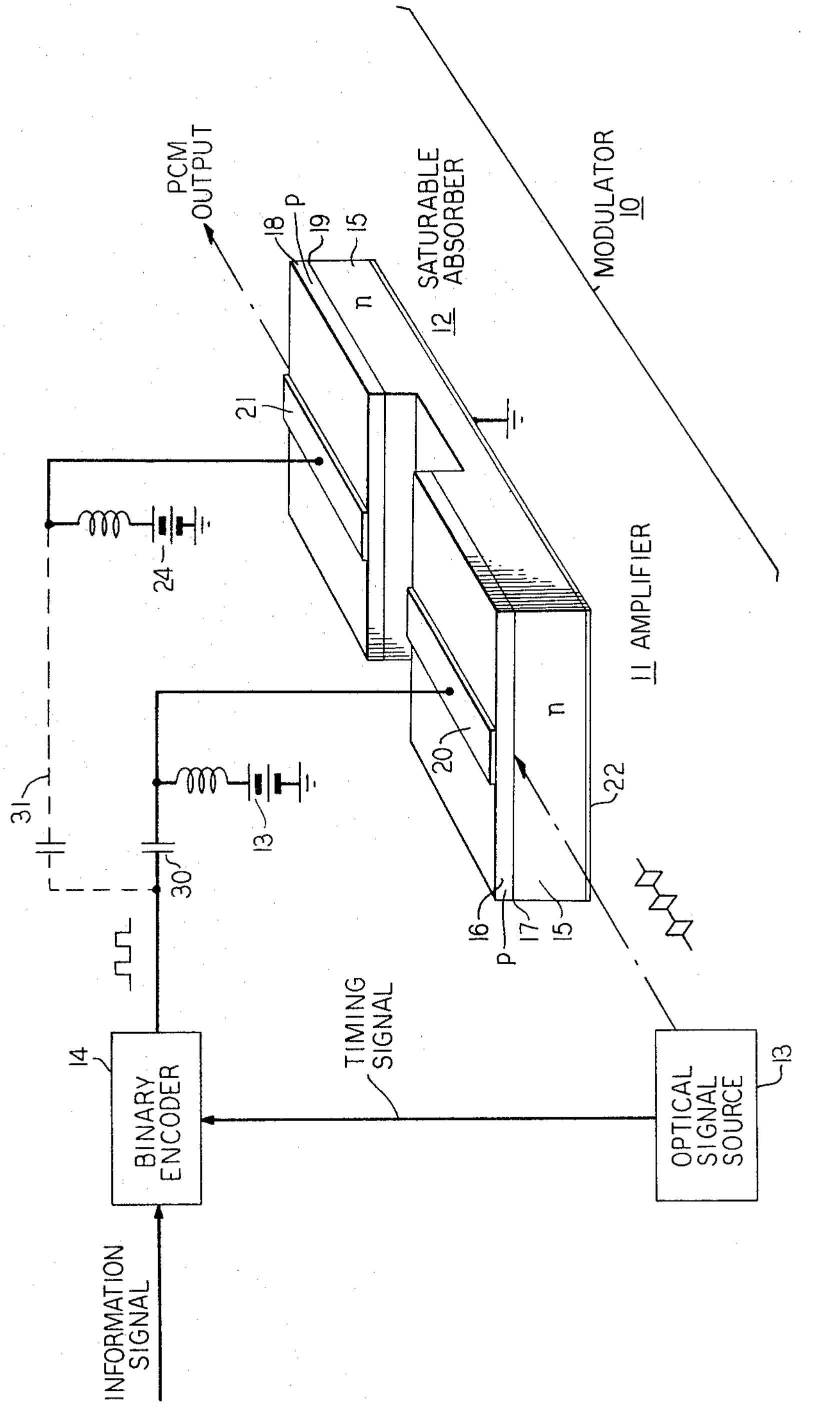
FIG. 1 shows a modulator in accordance with the present invention.
Figure 2A:
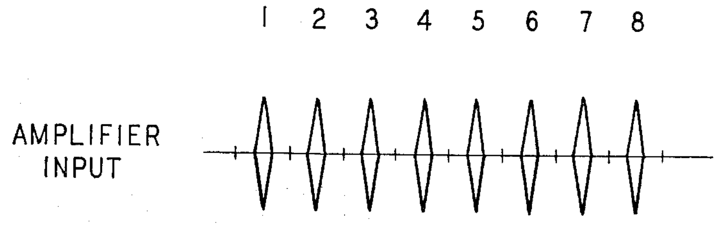
FIGS. 2A, 2B, 2C and 2D included for purposes of explanation, show the signals applied to and derived from the modulator of FIG. 1.
Figure 2B:
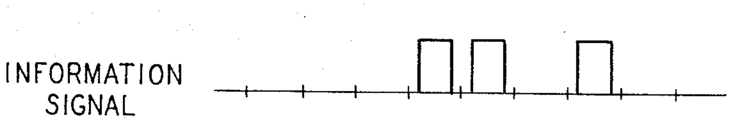
Figure 2C:
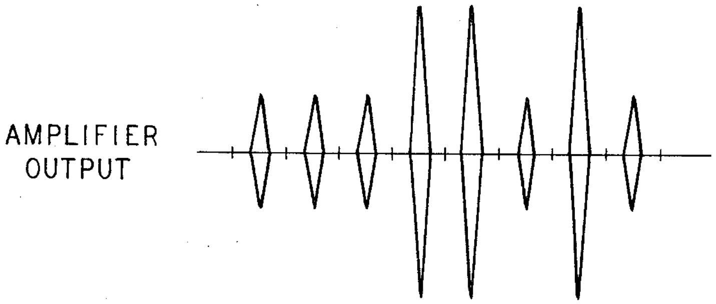
Figure 2D:
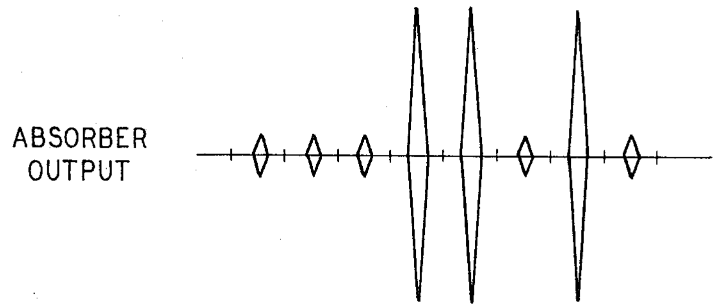

As is known, a forward-biased junction diode is capable of emitting radiant energy. If the diode is located within a suitable cavity, oscillations will take place. In the absence of a cavity, or by controlling the magnitude of the applied bias, an amplifier rather than an oscillator is obtained. In accordance with the present invention, the ends of the diode structures comprising amplifier 11 and saturable absorber 12 are advantageously provided with anti-reflection coatings so as to preclude any possibility of oscillations being produced. In all other respects the diodes can be any one of the many well-known diode laser structures. For purposes of illustration, each of the diode structures shown is similar to that disclosed in U.S. Pat. No. 3,363,195. Specifically, amplifier 11 comprises a semiconductor material, the bulk 15 of which is of one conductivity type, *n*, topped by a thin surface layer 16 of the opposite conductivity type, *p*, to form a p-n junction 17 therebetween. Absorber 12, which is advantageously made of the same semiconductor material as amplifier 11, similarly comprises an *n* conductivity type portion which, for convenience, can be an extension of the *n* conductivity type bulk portion 15 of amplifier 11, topped by a thin surface layer 18 of *p* type material, to form a p-n junction 19 therebetween.

Biasing current is injected into the diodes by means of thin, elongated metallic electrodes 20 and 21, located, respectively, on the *p*-type layers 16 and 18, and a metal electrode 22 in contact with the underside of the common, *n*-type bulk portion 15.

The use of elongated electrodes 20 and 21 effectively confines the "active" junction region to within the immediate area of the electrodes. Since the two active regions are preferably aligned such that radiant energy emitted by amplifier 11 is most efficiently coupled into the active region of absorber 12, the long dimension of electrodes 20 and 21 are coaxially aligned, and the p-n junctions 17 and 19 are made to lie in a common plane. This is conviently achieved by means of the monolithic structure shown in FIG. 1.

Optical signal source 13 generates a continuous train of optical pulses. These can be generated by a single injection laser made of the same material as modulator 10, in the manner described by T. P. Lee and J. R. Roldan in an article entitled "Subnanosecond Light Pulses From GaAs Injection Lasers," published in the November, 1969 issue of the I.E.E.E. Journal of Quantum Electronics, pp. 551–552, or by a double-section injection laser, as described by Lee and Roldan in an article entitled "Repetitively Q-Switching Light Pulses From GaAs Injection Lasers With Tandem Double-Section Stripe Geometry," published in the June, 1970 issue of said journal.

A timing signal, also generated by source 13, is coupled to the binary encoder to synchronize the information pulses with the optical pulses. Alternatively, a separate timing source can be used, in which case a first timing signal is applied to optical source 13 to obtain a train of optical pulses whose repetition rate is synchronized with the timing source. Simultaneously, a second signal from the timing source is used to synchronize the binary encoder.

Encoder 14 accepts an information signal and converts it into a binary-encoded signal which is then coupled to bias electrodes 20–22 of amplifier 11. A direct current biasing source 23 is also coupled to electrodes 20–22. A second, direct current biasing source 24 is optionally coupled to biasing electrodes 21–22 of saturable absorber 12.

In operation, optical pulses, derived from source 13, are directed into the active junction region of amplifier 11. Simultaneously, the binary-encoded information signal is coupled to the amplifier biasing electrodes 20–22 by means of a coupling capacitor 30. The former are indicated by pulse train A in FIG. 2, and the latter by pulse train B. For purposes of explanation, a series of spaces and marks to form an 8-bit binary word 00011010 is illustrated.

The amplifier is forward-biased by means of source 23 so as to have approximately unity gain in the absence of any additional biasing provided by the information signal. This is done primarily to minimize the amplifier delay. As is known, it takes a finite time to build up the necessary population inversion required to produce gain. In accordance with the present invention, this time delay is minimized by "priming" the amplifier to approximately unity gain. As a result, the amplitude of the optical pulses at the output end of amplifier 11 is essentially equal to the amplitude of the input pulses in the absence of an information signal pulse. Referring to pulse train B, this corresponds to the condition existing during time slots 1, 2, 3, 6 and 8. Accordingly, the amplifier output pulse train, as represented by pulse train C, includes optical pulses having essentially the same amplitude as the input pulse train during the above-identified time slots. During time slots 4, 5 and 7, on the other hand, the information signal pulses increase the forward-bias in the amplifier and, correspondingly, increase the amplifier gain. The optical output pulses occupying time slots 4, 5 and 7 are, therefore, much larger, as is also indicated by pulse train C.

Having modulated the optical pulse train in accordance with the binary-encoded information, the optical signal is now passed through the saturable absorber which increases the power ratio between the optical pulses representing the two binary states. In particular, saturable absorber 12 is zero-biased or reversed-biased such that the lower amplitude optical pulses, occupying time slots 1, 2, 3, 6 and 8, are highly attenuated. The larger amplitude pulses, on the other hand, are sufficiently large so as to drive the saturable absorber beyond saturation, greatly reducing the attenuation through the absorber. As a result, the optical pulses in time slots 4, 5 and 7 experience relatively little attenuation compared to the attenuation experienced by pulses in the other time slots, producing pulse train D illustrated in FIG. 2. As will be noted, the optical pulses corresponding to spaces in the information signal are much more severely attenuated than the pulses corresponding to marks in the information signal, thus increasing the power ratio, which is ratio of the intensity of the optical pulses for the two binary states.

A further improvement in the power ratio can be realized by simultaneously coupling the information signal to the bias electrodes of the saturable absorber. This optional arrangement is illustrated in FIG. 1 by the dotted connection 31. If this is done, the reverse bias on the saturable absorber is reduced whenever the amplifier is in its high gain state. This has the effect of further reducing the attenuation of the saturable absorber in its low attenuation state, thus increasing the amplitude of the optical pulses in time slots 4, 5 and 7.

EXAMPLE

To illustrate one embodiment of the invention, a Q-switched GaAs laser is used as the optical signal source. Such a source can produce a continuous train of pulses having a pulse repetition rate of 500 MHz, a pulse width of 100 picoseconds, and a peak pulse power of 100 m watts.

Table I, below, lists three types of junction diodes that can be used as an amplifier. Also listed are the currents required to produce unity gain and to produce 10 db of gain, thus defining the two signal states, for such diodes with active junction areas of the order of $5 \times 10^{-5}$ cm$^2$.

| | Diffused junction GaAs | Single Hetero-junction $Ga_xAl_{1-x}As$ | Double Hetero-junction $Ga_xAl_{1-x}As$ |
|---|---|---|---|
| Current for unity gain | 5 amps | 0.5 amp | 0.05 amp |
| Current for 10 db gain | ≈ 7.5 | ≈ 0.7 | ≈ 0.12 |

TABLE I — AMPLIFIER

Table II describes three saturable absorbers, using the same three types of junction diodes.

| | Diffused junction GaAs | Single Hetero-junction $Ga_xAl_{1-x}As$ | Double Hetero-junction $Ga_xAl_{1-x}As$ |
|---|---|---|---|
| Max absorption Coefficient $\alpha_o$ per cm | 10 | 50 | 10 |
| Absorber length* | 0.04 cm | 0.08 cm | 0.4 cm |
| Minimum power out | 0.018 watts | 0.018 watts | 0.018 watts |
| Maximum power out | 0.600 watts | 0.600 watts | 0.600 watts |

TABLE II — SATURABLE ABSORBER

* The indicated absorber lengths are estimated assuming input pulses at the amplifier of 100 m watt peak power, and amplifier gains of unity and 10 db for the two binary states.

For purposes of illustration, a modulator comprising a diffused junction amplifier and a diffused junction saturable absorber is considered. For one binary state of the information signal, about 5 amperes of forward bias current is applied to the amplifier, which then passes the incident optical pulse with unity gain. The 0.100 watt optical pulse would then be attenuated to 0.018 watts by the saturable absorber.

For the other binary state, the amplifier current is increased to produce 10 db of gain. The signal applied to the saturable absorber is then 1 watt, which results in an output signal of 0.600 watts. The ratio of output powers for the two signal states, i.e., the so-called extinction ratio of the modulation, is then 0.600/0.018, or about 25 db.

While a p-n diode is used in the illustrative embodiment as the saturable absorber, it will be recognized that other types of saturable absorbers can alternatively be used, provided they respond at the frequency of interest and saturate at an optical power level between these representatives of the two binary states. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. An optical wave modulator comprising:
a binary-encoded information signal source;
a variable gain optical wave amplifier for amplifying externally applied optical wave energy;
means for coupling said signal source to said amplifier for increasing the gain of said amplifier for one binary state of said information signal while maintaining a lower amplifier gain for the other binary state of said information signal;
and a saturable absorber positioned to receive optical wave energy from said amplifier and to attenuate optical wave energy corresponding to said other binary state to a greater degree than optical wave energy corresponding to said one binary state.

2. The modulator according to claim 1 wherein said amplifier is a p-n junction diode.

3. The modulator according to claim 1 wherein said saturable absorber is a p-n junction diode.

4. The modulator according to claim 1 wherein both said amplifier and said saturable absorber comprise a monolithic structure including two p-n junction diodes.

5. The combination comprising, in cascade:
a source of optical pulses and an optical wave modulator;
said modulator including:
a p-n junction diode optical wave amplifier having its junction aligned with the direction of propagation of optical pulses derived from said source;
means for biasing said diode to transmit said optical pulses at approximately unity gain;
means, comprising a binary-encoded information signal source synchronized with said optical pulses, for modulating the bias applied to said diode so as to increase the gain of said amplifier for one binary state of said information signal while maintaining unity gain for the other binary state of said information signal;
and a saturable absorber positioned to receive optical pulses from said amplifier and to attenuate optical wave energy corresponding to said other binary state to a greater degree than optical wave energy corresponding to said one binary state.

6. The combination according to claim 5 wherein said saturable absorber is a p-n junction diode.

7. The modulator in accordance with claim 6, including means for modulating the bias applied to said saturable absorber in accordance with said information signal.

* * * * *